United States Patent [19]

Bikson et al.

[11] Patent Number: 4,800,019

[45] Date of Patent: Jan. 24, 1989

[54] TUBESHEET FOR SEMIPERMEABLE MEMBRANE DEVICES

[75] Inventors: Benjamin Bikson, Brookline; Salvatore Giglia, Norwood, both of Mass.

[73] Assignee: Union Carbide Corporation, Danbury, Conn.

[21] Appl. No.: 184,799

[22] Filed: Apr. 22, 1988

[51] Int. Cl.[4] .............................................. B01D 13/00
[52] U.S. Cl. ................................... 210/321.8; 55/158; 210/321.89; 210/450
[58] Field of Search .................... 55/16, 158; 210/450, 210/456, 500.23, 321.8, 321.89; 264/45.8, 342 R, 345

[56] References Cited

U.S. PATENT DOCUMENTS

| | | | |
|---|---|---|---|
| 4,323,453 | 4/1982 | Zampini | 210/321.1 |
| 4,380,460 | 4/1983 | Otstot et al. | 55/158 |
| 4,547,289 | 10/1985 | Okano et al. | 210/652 |
| 4,623,460 | 11/1986 | Kuzumoto et al. | 210/321.1 |
| 4,671,809 | 6/1987 | Taketomo et al. | 55/158 |

*Primary Examiner*—Frank Spear
*Attorney, Agent, or Firm*—Alvin H. Fritschler

[57] ABSTRACT

A method for producing hollow fiber permeable devices having an essentially leak-free seal between the hollow fibers and the tubesheet that consists of heating the tubesheet containing the hollow fibers potted therein at a temperature essentially equal to or greater than the glass transition temperature of the thermoplastic material or the softening point of the thermoset material of the hollow fiber for a period of time sufficient to essentially densify the hollow fibers in the potted portion of the tubesheet and whereby a major portion of the interior diameter of the bores of the hollow fibers embedded in the tubesheet is enlarged; and the fiber permeable devices themselves.

17 Claims, 2 Drawing Sheets

FIG. IA

FIG. IB

TUBESHEET FOR SEMIPERMEABLE MEMBRANE DEVICES

FIELD OF THE INVENTION

This invention relates to semipermeable membrane devices having porous hollow fibers (i) wherein the seal between said hollow fibers and the tubesheet, or potting resin, is essentially leak free, (ii) wherein a major portion of the hollow fibers embedded in the tubesheet is densified and has a larger bore diameter than the bore diameter of the porous hollow fibers not embedded in the tubesheet, and (iii) methods for producing such permeable membrane devices.

DESCRIPTION OF THE PRIOR ART

The patent literature and technical ournals are replete with numerous publications pertaining to the preparation of semipermeable membranes and use of semipermeable membrane devices for recovering at least one component from a mixture of two or more components. These semipermeable membranes are used for any of the known separations, e.g., gas-gas, gas liquid, liquid-liquid, gas solid, liquid solid, etc., and have been used in processes involving gas separation, water desalination, microfiltration to separate fine particles or bacteria from liquid compositions, ultrafiltration to separate dissolve solids from a liquid solution, and the like. In essentially all instances the membranes are porous to some degree and include the anisotropic membranes, which can be composite or asymmetric.

In the field wherein a gas is recovered from a mixture of gases use has been made of asymmetric and composite membrane devices in which semipermeable membrane can be constructed from organic materials, e.g., an organic polymer, or inorganic materials. Asymmetric type membranes are generally comprised essentially of a single permeable membrane material capable of selectively separating at least one component from a fluid mixture containing said at least one component in admixture with other components. Asymmetric membranes are distinguished by the existence of two or more morphological regions within the membrane structure; one such region comprising a thin, relatively dense semi permeable skin capable of selectively permeating at least one component from a fluid mixture containing said at least one component in admixture with other components, and the other region comprising a less dense, porous, essentially non selective support region that serves to preclude the collapse of the thin skin region of the membrane during use. Composite membranes generally comprise a thin layer coating of a suitable semipermeable membrane material superimposed on a porous substrate. All of the above types of membranes have been produced in flat sheet form or hollow fiber form.

The invention that is the subject matter of this patent is essentially concerned with semi-permeable membrane devices constructed of hollow fiber separation membranes of various morphological structures that are further distinguishable by a substantial reduction and densification, as hereinafter discussed, of the hollow fiber walls embedded in the tubesheet that separates the permeate side of the device from the feed side.

The problems associated with the manufacture of membrane devices (e.g., modules) produced by potting hollow fiber membranes are well known. In addition, pressure build up in the hollow fibers embedded in the tubesheet has always been a problem; another problem often encountered has been that of obtaining a clean, fully-opened bore end. In any hollow fiber membrane module the existence of a fluid-tiqht relationship between the hollow fiber and the potting composition during the separation operation is essential. There should be no fluid leakage in a membrane based separation process between the membrane and its surroundinqs at the area that separate the hiqh and low pressure sides of the membrane modules; a leak-free condition must exist between the hollow fibers and the tubesheet. It has been observed, however, that under high pressure conditions the hollow fibers are sometimes liable to compressive deformation. This can result in the hollow fibers pulling away or shrinking away from the surface of the potting material at the pot-fiber interface and creating minute passageways for the feed fluid to flow through and admix with the permeate fluid, resulting in a less desirable product purity.

The potting or formation of tubesheets surrounding the end portions of bundles of hollow fiber membranes is well known technology and is per se not the subject of this invention. Thus, U.S. Pat. No. 3,422,008, issued on Jan. 14, 1969 to E. A. McLain, describes a potting procedures at column 11, lines 11 to 38. U.S. Pat. No. 4,183,283, issued on Jan. 15, 1980 to Damos et al., at column 6, lines 1 et seq., describes other potting procedures. M. J. Coplan et al., in U.S. Pat. No. 4,207,192 issued on June 10, 1989, pertains to hollow filament separatory modules; at column 12, line 46 et seq., a still further potting technique is disclosed. The invention claimed in U.S. Pat. No. 4,323,453, issued on Apr. 6, 1982 to A. Zampini, is directed to the use of defined imidazole curing agents for the epoxy potting compositions and fully discloses the processing steps and components required. Commencing at column 12, line 20 and continuing to line 59, Zampini discusses the use of heat during post curing and he repeatedly states that the peak temperature for final curing during solidification should be below about 10° C. or 20° C. below the glass transition temperature of the hollow fiber membranes (see column 12, lines 25 28, lines 37 40, lines 54 56). Further descriptions of the potting procedure can be found in U.S. Pat. No. 4,369,605, issued on Jan. 25, 1983 to Opersteny et al., at column 3, lines 35 et seg.; in U.S. Pat. No. 4,389,363, issued June 21, 1983 to Molthop, wherein the ends of the hollow fibers are filled with a liquid capable of entering the micropores to minimize entry of the potting material into the bores; in U.S. Pat. No. 4,547,289, issued Oct. 15, 1985 to Okano et al., in which polysulfone hollow fibers are potted in epoxy resins cured at 60° C to 150° C, a temperature below the glass transition temperature of polysulfone; in U.S. Pat. No. 4,623,460, issued to Kuzumoto et al. on Nov. 18, 1986, in which the potting portion of a bundle of hollow fibers is dried with hot air to decrease the outer diameter of the bundle before it is potted, during this heating the outside diameter of the hollow fibers and the inside diameter of the bores are reduced; though the process eliminates some of the problems encountered in tubesheet manufacture it creates a number of new problems associated with the reduced inside diameter of the shrunken hollow fibers particularly during the severing or slicing step and in creating excessive pressure drops due to the smaller inside diameter that can substantially decrease performance of the semipermeable membrane devices subjected to the Kuzumoto et al. technique; in U.S. Pat. No. 4,686,039, issued to Otstot et al. on Aug. 11, 1987, at column 5, lines 20, et seq., which discloses preparation of fluid separation modules that have been potted at one or both ends. In an earlier Otstot et al. patent, U.S. Pat. No. 4,380,460 issued on Apr. 19, 1983, mention is made at column 3, lines 4-7 that in and adjacent to this wicked region the hollow fibers are most brittle and fragile, apparently because of the heat applied to the fibers during the curing of the tubesheet; however, no indication of the temperature used was given.

Though there exists extensive material on the production of the tubesheet, or the potting procedure, none of the references appear to suggest or disclose the improvement described herein.

SUMMARY OF THE INVENTION

This invention comprises a method for producing a porous hollow fiber semipermeable membrane devices characterized by an essentially leak free seal between the hollow fibers and the tubesheet having over all improved properties, and to the improved hollow fiber permeable membrane devices. In the method of this invention the tubesheet is heat treated above the softening temperature of the polymer at a temperature essentially equal to or greater than the glass transition temperature of the porous polymer of the hollow fiber. Heating is continued for a period of time sufficient to essentially densify the porous walls of the hollow fibers in the potted portion of the tubesheet. The term "essentially densify" means that the porous hollow fiber potted in the tubesheet is at least about twenty five percent, preferably at least about fifty percent to about one hundred percent, densified as compared to the level of porosity of the hollow fiber prior to the heat treatment. In the process of this invention the following improvements are attained, the major portion of the bores of the hollow fibers and a major portion of the length of the hollow fibers embedded in the tubesheet have a larger bore diameter than the bore diameter of the section of the porous hollow fibers not embedded in the tubesheet, and the walls of its hollow fiber have been densified.

THE DRAWINGS

FIG. 1 is a cross sectional view of a single hollow fiber permeable membrane embedded in the tubesheet wherein

In FIG. 1, 1 represents the tubesheet, 2 represents the hollow fiber, 3 represents the bore of the hollow fiber, 4 represents the porous wall of the hollow fiber prior to heating at a temperature essentially equal to or greater than the glass transition temperature of the hollow fiber, and 5 represents the densified wall of the hollow fiber after it was heat treated by the process of this invention at a temperature essentially equal to or greater than the glass transition temperature of the hollow fiber, and O.D. and I.D. represent the outside diameter and inside diameter of the hollow fiber. As seen in the drawing heat treatment has essentially no effect on the outside diameter but it does increase the inside diameter, or bore size, of the hollow fiber.

DETAILED DESCRIPTION OF THE INVENTION

In accordance with this invention hollow fiber permeable membranes are produced which have an essentially leak free seal between the hollow fibers and the tubesheet, and essentially densified hollow fibers embedded in the tubesheet. The membranes are useful to effect separation of any mixture separable by a semi-permeable membrane, e.g., gas/gas, gas/liquid, liquid/liquid, liquid/solid (including dissolved solids) mixtures. They are generally fabricated as units commonly referred to as modules, the design and construction of such modules being well known to one of ordinary skill in this art and thus requiring no detailed explanation. As is known, the modules can be single ended or double ended.

Porous hollow fiber permeable membrane modules can be fabricated in many shapes. Thus, longitudinal bundles of the porous hollow fibers sealed in a suitable retainer; spirally wound bundles of the porous hollow fibers sealed in a suitable retainer; as well as any other configuration. In most instances the ends of the porous hollow fibers are embedded in a tubesheet, commonly known as potting, and the tubesheet is cut or sliced or severed so the ends of the porous hollow fibers are opened to allow unobstructed flow. The modules are constructed to provide a separation of flow of the feed over the external surface of the hollow fibers from any flow of the permeate within the bores of the hollow fibers enabling recovery of the permeated component from othe components originally present in the original feed mixture. In some instances the reverse procedure may be used, the feed may be introduced into the bores of the hollow fibers and the permeate recovered from the external surface of the hollow fiber. Different arrangements of feed and permeate flow patterns and modules for separating at least one component from a mixture of said at least one component with at least one other component in admixture thereof are well known in the art.

In the production of porous hollow fiber permeable membrane modules one or both ends of a plurality or a bundle of the porous hollow fibers is embedded or potted in a tubesheet; many procedures are known for accomplishing this. In a typical procedure of the process of this invention the end of the hollow fiber bundle, comprised of any known configuration, is placed in a mold, the mold is filled with the potting resin composition to the desired depth, and the bundle retained in the resin filled mold until the resin hardens. Heat may be used, if desired, to assist curing. After the resin has hardened the integral tubesheet is cured at ambient or elevated temperature. After it has cured at ambient or elevated temperature below the glass transition temperature of the porous hollow fiber the tubesheet or potted portion of the module is subsequently heat treated by the process of this invention at a temperature essentially equal to or greater than the glass transition temperature of the thermoplastic polymer of the porous hollow fiber, or at a temperature not less than about 5° C below the softening point of a thermoset resin. The term "essentially equal" means at a temperature not less than about 5° C, preferably not less than 2° C, below the glass transition temperature of the thermoplastic polymer of the porous hollow fiber. The heat treatment can be performed either before or after the tubesheet is sliced, cut or severed to open the bores of the ends of the porous hollow fibers and can be effected by any convenient heating technique. Alternatively one can omit the intermediate ambient or elevated temperature cure of the potting resin and, after the resin hardens, directly proceed to heat treat the tubesheet or potted portion of the module at a temperature essentially equal to or greater than the glass transition temperature of the polymer of the porous hollow fiber by the process of this invention. This, too, can be performed either before or after the slicing, cutting or severing operation. Generally, the preferred method is to heat-treat by the process of this invention before severing the tubesheet. This slicing, cutting or severing of the tubesheet is a known procedure to open the bores of the fibers after the module has been produced. One or more of these terms is used here to represent this opening step; however, the term used applies to any procedure for accomplishing this objective even though a different specific term has not been referred to here.

In addition, the semipermeable fluid separation devices of this invention have an economic advantage over devices made usinq previously known procedures as is shown by calculations. In these calculations separation of hydrogen from a binary mixture, e.g., 40 $H_2$/60 $CH_4$, was studied. The separation permeability characteristics of the hollow fiber module were as follows:

permeation rate 5ft$^3$(STP)/ft$^2$.psi.day separation factor $H_2$/$CH_4$ 50

The feed pressure used in this case study was 500 psia; permeate pressure was 20 psia; the permeate composition requirement was set at 90% hydrogen purity. The dimensions of the semipermeable hollow fiber membrane device used in this study were:

| | |
|---|---|
| membrane area | 100 ft$^2$ |
| active length of hollow fibers outside tubesheet | 45 inches |
| length of hollow fibers in tubesheet | 5 inches |
| outside diameter of hollow fiber | 15 mils |
| inside diameter of hollow fiber | 5 mils |

Using known calculating methods described in the literature, e.g., Handbook of Separation Process Technology, R.W. Rousseau, Ed., John Wiley & Sons, Inc. (1987); Membranes in Separations, Sun-Tak Hwang g K. Kammermeyer, Robert E. Krieger Publishing Co. (1975); and C.Y. Pan, "Gas Separation by High Flux Asymmetric Hollow Fiber Membranes", AIChE J. 46 (1986), the operating conditions and the percent recovery of the desired hydrogen purity were calculated and found to be:

| | Module I | Module II |
|---|---|---|
| Δ Pp, psi | 26.4 | 2.7 |
| Δ Po, psi | 66.9 | 56.6 |
| θ, % | 32.5 | 34.5 |
| Q/A, [1(STP)/min]/ft$^2$ | 6.99 | 7.21 |
| φ, % | 73.3 | 77.6 |

Δ Pp = pressure drop through tubesheet
Δ Po = pressuse drop over entire fiber length including the fiber length in the tubesheet
θ = stage cut
Q/A = permeate flow rate/membrane area
φ = recovery of fast gas
Module I has a conventional tubesheet
Module II has a tubesheet heat treated by the process of this invention; inside diameter of the hollow fibers in tubesheet after treatment was 10 mils.

The improvements and economic advantage of using Module II are apparent in the higher hydrogen recovery.

As is known to one of ordinary skill in the art, each thermoplastic polymer composition has its own specific glass transition temperature and each thermoset composition has its softening point. Thus, the temperature at which the heat treatment will be performed is dependent upon the polymer composition of the hollow fiber. During the heat treatment, that portion of the porous hollow fibers present in the tubesheet essentially densifies and the internal diameter of the bore of the fibers increases. At the same time the exterior surface of the hollow fibers remains bonded to the tubesheet. In view of the densification of the hollow fibers present in the tubesheet, the physical and structural integrity of this portion of hollow fibers is increased and is therefore less subject to deformation and delamination in use and/or under pressure. The heat treatment is preformed at a temperature that does not adversely affect the tubesheet. During the heat treatment the interface between the hollow fibers and the tubesheet is cooled (e.g., with cool air) so as to prevent the heat from damaging the hollow fibers at the interface.

An additional advantage of this invention is that as a result of the hollow fiber densification, fibers in the tubesheet have a larger bore diameter. The larger bore diameter allows for a smaller bore side pressure drop in fluid separation applications and, therefore, a more efficient separation and flow. In addition, in those instances in which severing of the tubesheet is conducted subsequent to our heat treatment operation, the larger bore diameter of the densified hollow fibers in the tubesheet generally provides for better opening of the densified hollow fiber ends in the tubesheet without melting fiber ends. These advantages are attained without any noticeable harmful effect on the properties or utility of the porous hollow fibers permeable membrane modules of this invention.

The time required for the heat treatment will vary depending upon the composition of the porous hollow fiber membrane and the composition of the tubesheet and the size of the module. It can vary from about 15 minutes for small tubesheets to about 5 hours or more for large ones, preferably from about 1.5 hours to about 2.5 hours for the larger ones at the heat treatment temperature.

The process described and claimed in this invention achieves the goal of essentially leak free fluid separations by hollow fiber membranes at relatively high pressures. As previously indicated, by heating the tubesheet at a temperature essentially equal to or greater than the glass transition temperature of the thermoplastic polymer or the softening point of the thermoset polymer of the porous hollow fiber, the porous hollow fiber in the tubesheet essentially densifies and becomes essentially incompressible. This temperature generally is not harmful to the tubesheet and in many instances, e.g. epoxy resins, results in greater crosslinking of the potting composition and/or higher heat distortion temperature of the tubesheet polymer, both being desirable. Potting materials that would degrade at the heat treatment temperatures should be avoided when using the method of this invention. The incompressibility of the densified hollow fibers results in a more integral unit and essentially or total elimination of the densified hollow fibers pulling away from the tubesheet and causing leakage between the walls of the hollow fibers and the tubesheet.

The fact that the high temperature heat treatment process of this invention would enable one to produce porous hollow fibers permeable membrane devices having such improved properties was completely unexpected and unpredictable. Thus, in U.S. Pat. No. 4,323,453, it is stated curing most generally occurs in three stages, initiation of curing stage, solidification stage, and cross linking stage. The patent states the cure initiation stage should be carried out such that undesirable peak exotherm temperatures are not produced and, frequently, the peak exotherm temperature of the curing reaction is at least 10° C. or 20° C. below the glass transition temperature of the hollow fiber membrane (column 12, lines 18 to 30). The patent then states the second solidification stage should be carried out at elevated temperature, advantageously so the peak temperature during solidification is at least 10° C or 20° C below the glass transition temperature of the hollow fiber membrane, sometimes the peak exotherm temperature during solification being less than about 100° C (column 12, lines 31 to 42). In the final cross linking stage, which is considered optional, a temperature at least as high as the peak temperature during the solidification but below about 10° C or 20° C below the glass transition temperature of the hollow fiber membrane is disclosed (column 12, lines 43 to 57). In all three stages the patent requires a temperature that is always below about 10° C or 20° C below the glass transition temperature of the hollow fiber membrane. The highest temperature disclosed for use in this patent does not exceed the peak temperature and the peak temperature is always below the glass transition temperature of the hollow fiber membrane by at least 10° C or 20° C. U.S. 4,323,453 does not disclose or suggest heat treatment of the tubesheet or potting portion of a porous hollow fiber semipermeable membrane device at a temperature essentially equal to or greater than the glass transition temperature of the hollow fiber. In fact the patent states that at all three stages the temperature must be below about 10° C or 20° C below this glass transition temperature.

The process disclosed in U.S. Pat. No. 4,623,360 is alleged to overcome some of the problems encountered in potting membranes that have a sponge layer, such as swelling and shrinkage that cause separation and cracking and result in leakage between the hollow fiber membranes and the cured potting composition or tubesheet. The patent allegedly accomplishes this by drying the outer surfaces of the end portions of a bundle of porous hollow fibers with hot air at a temperature of 90° C to 100° C before the bundle is potted. This differs significantly from the process of this invention since it does not teach the heat treatment of the tubesheet after the porous hollow fibers have been potted, it does not teach increasing the inside bore diameter of the hollow fiber, nor does it teach or suggest heating the tubesheet at a temperature essentially equal to or greater than the glass transition temperature of the porous hollow fiber. In practice this process tends to decrease both the outside diameter and the inside bore diameter of the hollow fiber.

In accordance with this invention, a porous hollow fiber membrane module is initially prepared by the known, conventional procedures used and practiced by those skilled in the art. The actual preparation of such modules is not the subject of this invention and any of the known procedures (e.g., as shown in U.S. Pat. No. 4,207,192) for their preparation, including the procedures for the initial potting or preparation of the tubesheet to encapsulate the end or ends of the porous hollow fiber bundle, can be used. After the modules have been prepared they are subjected to the process of this invention. This involves the high temperature treatment of the tubesheet portion of the module containing the encapsulated porous hollow fibers at a temperature essentially equal to or greater than the glass transition temperature of the thermoplastic porous hollow fibers for a period of time sufficient to essentially densify the thermoplastic hollow fibers encapsulated in the tubesheet, or heating the encapsulated thermoset porous hollow fibers at about the softening temperature of the fibers encapsulated in the tubesheet. As a consequence of this heat treatment the hollow fiber in the tubesheet densifies and the major portion of the bores of the hollow fibers and a portion of the length of the hollow fibers embedded in the tubesheet now have a larger inside bore diameter than the inside bore diameter of the porous hollow fiber not embedded in the tubesheet. In addition the walls of the hollow fibers embedded in the tubesheet are now essentially fully dense and non-compressible. The fibers will not shrink from the pot-fiber interface at operating pressures during fluid separation processes and there is essentially no leakage at the interface between the outside surface wall of the hollow fibers and the tubesheet. Also, because the inside diameter of the fiber bore openings has increased due to the hollow fiber wall densification, pressure drop through the bores in the tubesheet during fluid separation operation is lower. Another advantage is that the opening of the fiber bore ends in the tubesheet is facilitated due to the larger bore openings present.

The heat treatment process of this invention is conducted under conditions that do no damage the fiber tubesheet interface. When the tubesheet is heated a the indicated conditions the temperature at the interface should be controlled to prevent fiber damage. This can be accomplished by blowing cool air (or other means) across the interface during the heat treatment of the interface.

It is important that the exterior walls of the hollow fibers embedded in the tubesheet adhere to the tubesheet before, during and after the heat treatment of this invention. In many instances there is a natural adhesion between the hollow fiber material and the tubesheet material and the two form a strong adhesive bond. In other instances the use of coupling agent to promote adhesion may be necessary; these agents and their use are known in the art. In the absence of adhesion the fiber may shrink away from the tubesheet causing leaks in the system. The potting material used must be one capable of tolerating the high heat treatment temperature and should not shrink or pull away from the hollow fibers.

The heat treatment of the tubesheet by the process of this invention can be carried out either before or after the tubesheet has been sliced, severed or cut by any of the known methods. Thus, the bundle of hollow fibers may be potted in conventional manner, as previously described, then the tubesheet portion is heated by the process of this invention at a temperature essentially equal to or greater than the glass transition temperature of the thermoplastic hollow fibers or at about the softening temperature of the thermoset hollow fibers for the requisite time, and finally the heat cured tubesheet is sliced by conventional means. Alternatively, the bundle of hollow fibers is potted in conventional manner, as previously described, after the potting composition has solidified the tubesheet is severed by conventional means, and then the tubesheet portion is heated by the process of this invention at a temperature essentially equal to or greater than the glass transition temperature of the thermoplastic hollow fibers or at about the softening temperature of the thermoset hollow fibers for the requisite time.

Heating can be effected in any convenient manner using conventional means, e.g., electrical heating elements, microwave, infrared means, with the heat applied to the tubesheet portion of the module that is to be treated by the process of this invention.

Subsequent to the post cure heat treatment by the process of this invention the hollow fiber bundle is installed in a suitable enclosure and the tubesheet provides a seal or barrier between the bore side and the exterior side of the hollow fibers. The fit between the enclosure and the tubesheet is a leak proof relationship that prevents the fluid composition from leaking or passing between the enclosure wall and the tubesheet. Alternatively, the tubesheet may be directly bonded to the shell.

The production of permeable hollow fibers and the materials used for their production are well known. Such hollow fibers are readily produced by the procedure described by I. Cabasso, "Hollow Fiber Membranes", Kirk-Othmer: Enc. of Chem. Tech., 12, Third Ed., 492–517 (1980) and I. Cabasso, "Membranes", Enc. of Pol. Sc. & Eng., 9, Second Ed., 509–579 (1987), incorporated herein by reference. Many hollow fibers are known to be porous with channels for fluid flow existing between the exterior and interior surfaces of the hollow fibers. The pores generally have an average cross-sectional diameter less than about 200,000 Angstroms and in some porous hollow fibers the average pore cross sectional diameter is less than about 50,000 or about 10,000 Angstroms; in some instances, the average pore cross sectional diameter can be as small as about 5 to about 200 Angstroms. Depending upon the intended use (e.g., gas/gas, liquid/liquid, microfiltration, ultrafiltration, etc.) one selects hollow fibers having the appropriate pore diameter sizes.

Advantageously the walls of the hollow fibers are sufficiently thick so that no special apparatus would be required for their handling. The outside diameter of the hollow fiber can vary from about 1 mil or less to about 100 mils or more, preferably from about 2 mils to about 80 mils. The wall thickness of the hollow fiber can vary from about 0.1 mil to about 12 mils or more, preferably at least about 0.2 mil up to about 20 mils.

In order to provide a desirable flux through the porous hollow fiber, particularly those hollow fibers having walls at least about 2 mils in thickness, hollow fibers having a substantial void volume are beneficially used. Voids are regions within the hollow fibers which are vacant of the material of the hollow fibers. Thus, when voids are present the density of the hollow fiber is less than the density of the bulk material of the hollow fiber. The void volume of the hollow fiber can be as high as 90 percent, or from about 10 percent to 80 percent, and sometimes about 20 to 70 percent, based on the superficial volume, i.e., the volume contained within the gross dimensions of the hollow fiber, excluding the bore volume.

Any of the porous hollow fibers produced from known organic materials that soften without decomposition can be subjected to the beneficial heat treatment step of this invention such as the natural and synthetic polymers, including their blends and alloys, thermoplastic or thermoset, preferably thermoplastic. Typical polymers can be substituted or unsubstituted polymers and may be selected from polysulfones; poly(styrenes), including styrene containing copolymers such as acrylonitrile-styrene copolymers, styrene butadiene copolymers and styrene vinylbenzylhalide copolymers; polycarbonates; cellulosic polymers, such as ethyl cellulose, cellulose acetate; cellulose acetate-butyrate, cellulose propionate, methyl cellulose, etc.; polyamides and polyimides, including aryl polyamides and aryl polyimides; polyethers; poly(arylene oxides) such as poly(phenylene oxide); polyurethanes; polyesters (including polyarylates), such as poly(ethylene terephthalate), poly(alkyl methacrylates), poly(alkyl acrylates), etc.; polysulfides; polymers from monomers having alpha olefinic unsaturation other than mentioned above such as poly(ethylene), poly(propylene), poly(butene 1), poly(4 methyl pentene-1), polyvinyls, e.g., poly(vnyl chloride), poly(vinyl fluoride), poly(vinylidene chloride), poly(vinylidene fluoride), poly(vinyl esters) such as poly(vinyl acetate) and poly(vinyl propionate); polyphosphazines; etc.

In many instances the hollow fiber is in the form of a composite membrane with a thin membrane forming material applied to the surface of the porous hollow fiber. This can be produced by any of the known procedures, e.g., as shown in U.S. Pat. No. 4,467,001, wherein a solution of the membrane forming material is applied to deposit a finished dry coating up to about 7,000 Angstroms, preferably from about 500 to about 2,000 Angstroms adhered to the exterior surface of the porous hollow fiber. In some instances adhesion is promoted by coupling agents and/or chemical treatment.

Typical of the useful membrane forming materials are polymers which can be substituted or unsubstituted. The materials include synthetic rubbers; natural rubbers; relatively high molecular weight and/or high boiling liquids; organic prepolymers; poly(siloxanes); polysilazanes; polyurethanes; poly(epichlorhydrin); polyamines; polyamides; acrylonitrile containing copolymers such as poly(g chloroacrylonitrile) copolymers; polyesters (including polylactams and polyarylates), poly(alkyl acrylates) and poly(alkyl methacrylates), polysuccinates, and alkyd resins; cellulosic polymers; polysulfones; poly(alkylene glycols) such as poly(ethylene glycol), poly(propylene glycol), etc.; polymers from monomers having α-olefinic unsaturation such as poly(olefins), e.g., poly(ethylene), poly(propylene), poly(butadiene), poly (2,3 dichlorobutadiene),- poly(chloroprene), poly(styrene) including poly(styrene) copolymers, e.g., styrene butadiene copolymer, polyvinyls such as poly(vinyl alcohols), poly(vinyl aldehydes) (e.g., poly(vinyl formal) and poly(vinyl butyral), poly(vinyl ketones) (e.g. poly(methyl vinyl ketone)), poly(vinyl esters) (e.g., poly(vinyl benzoate)), poly(vinyl halides), poly(vinylidene halides),; fluorinated ethylene copolymers; poly(arylene oxides); polycarbonates; and the like, and any interpolymers including block interpolymers containing repeating units from the above, and grafts and blends containing any of the foregoing, and monomers of the above mentioned polymers.

This invention is directed to semipermeable membrane devices in which densification of the hollow fiber and enlarging of the interior diameter of the hollow fiber bores embedded in the tubesheet with essentially no loss in adhesion between the tubesheet and hollow fibers, thermoplastic or thermoset, results. In some isolated instances these attributes may not be achieved and in those instances the membranes are not within the scope of this invention.

The tubesheets comprise the end portions of the bundle of hollow fibers embedded in a solid potting material. The formation of the tubesheet can be carried out in any suitable manner and such procedures are well known in the art, e.g., U.S. Pat. Nos. 3,339,341, 3,442,389, 3,455,460, 3,690,465 and U.S. Pat. No. 4,207,192, all of which are incorporated herein by reference. Generally the potting material is in liquid form when preparing the tubesheet and solidifies to a pressure resistant, leak-free structure. For the purpose of this invention the tubesheet should be stable at the high temperature used in the heat treatment of this invention.

The potting material can be inorganic or organic or a mixture thereof. The organic resins that solidify on cooling or curing are generally employed, particularly those which will form a strong adhesive bond to the exterior walls of the permeable hollow fibers and exhibit little shrinkage. These materials are well known and fully described in the literature, e.g., U.S. Pat. No. 4,369,605, incorporated herein by reference.

For convenience of description polysulfone porous hollow fibers are used to further describe the invention. However, as previously indicated the invention is not restricted to such fibers only. In a typical preparation of the hollow fibers used herein, polysulfone porous hollow fibers are spun from a dope composition by the procedure generally described by Cabasso et al., supra, using a ternary solution containing polysulfone, and dimethylformamide, with the total polymer concentration in the solution desirably being from about 25 to about 45 weight percent. The well known tube in tube jet technique was used in the spinning procedure, with water at about 21° C being the outside quench medium for the hollow fibers and the quench medium in the center of the fiber being air. Quenching was followed by washing and drying at elevated temperature prior to coating with the membrane forming material.

EXAMPLE 1

Polysulfone porous hollow fiber produced by the conventional procedure previously described were air dried at about 115° C by passing through a hot air drying column. The dried fibers were then annealed by passing through another hot-air oven at about 167° C. The annealed fibers were in line coated with a 1.3 weight percent cellulose acetate filtered solution, the solvent used to prepare this solution was a 40/40/20 by volume mixture of acetic acid/isopropanol/water. The coating procedure employed was that described in U.S. 4,467,001. The coated porous hollow fiber was dried prior to being taken up on a winder; the fibers had an average outside diameter of 14.1 mils and an average bore diameter (inside diameter) of 5.4 mils. Two polysulfone hollow fiber membrane modules were prepared by the procedure described in U.S. Pat. No. 4,207,192 having outside diameter of about 5.1 cm and length of about 30.5 cm. One end of each module was potted with epoxy resin to form a tubesheet, cured overnight at room temperature and then severed; the result was a looped module.

Module A The severed tubesheet of the first module was post cured at a temperature of 20° C, a temperature considerably lower than the lass transition temperature of the thermoplastic polysulfone hollow fibers, for two hours, which is the current conventional method generally employed. No change was noted in the outside diameter or inside bore diameter of the hollow fibers or of the tubesheet dimensions in this module. This module was prepared for comparative purposes and is typical of products heretofore produced. The active area of the finished module was 26 square feet.

Module B - This module was prepared by the process of this invention. The severed tubesheet of the second module was heat treated by the process of this invention at a temperature of 190° C, a temperature greater than the glass transition temperature of the thermoplastic polysulfone hollow fibers, for two hours. No change was noted in the outside diameter of the hollow fibers or of the tubesheet dimensions. However, the inside bore diameter of the hollow fibers now averaged 9.7 mils in that portion of the hollow fibers embedded in the tubesheet. The average inside diameter of the bore not embedded in the tubesheet and that was not heated above the glass transition temperature of the hollow fibers was still 5.4 mils. The walls of the hollow fiber in the tubesheet were essentially fully densified after the heat treatment, and noncompressible. The active area of the finished module was 26.6 square feet.

Figure 1A:
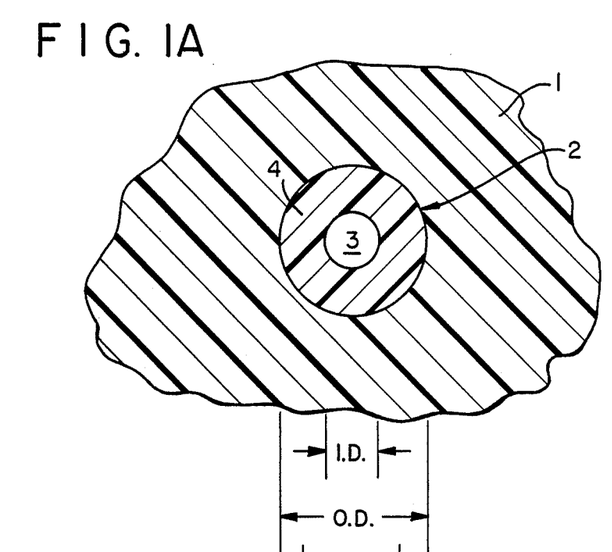
FIG. 1A shows the hollow fiber before heat treatment by the process of this invention and FIG. 1B shows the hollow fiber after heat treatment by the process of this invention.
Figure 1B:
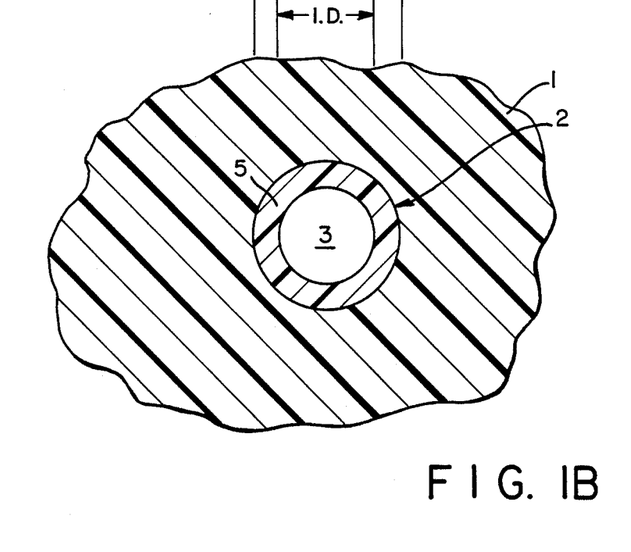
Figure 2:
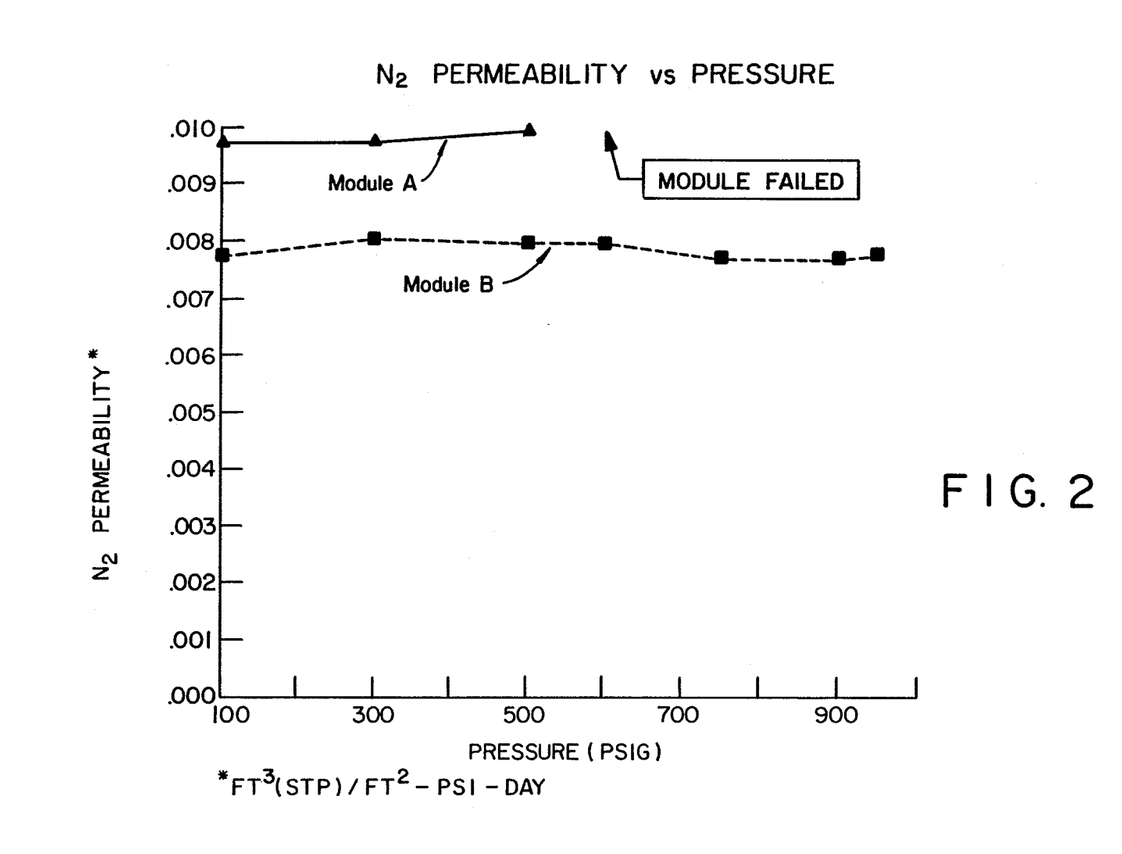
FIG. 2 is a plot of nitrogen permeability versus pressure based on the data derived in Example 1 using Module A produced by conventional procedures and Module B produced by the process of this invention. At a pressure approaching about 600 psi Module A failed due to leakage between the porous hollow fibers and the tubesheet. At this stage the module failed as evidenced by nitrogen leakage, which was substantially greater than 0.1 ft$^3$ (STP)/ft$^2$.psi.day, as is indicated in the plot by the upwardly pointing arrow. Module B showed no failure at a pressure approaching 1000 psi.

The permeation properties of the two modules were compared at 21° C using pure helium, pure nitrogen and a 10:90 helium/nitrogen mixture at various pressures for the same periods of time and are plotted in Figure 2. The mixture of helium and nitrogen was used because helium is a fast gas and nitrogen is a slow gas. The presence of the slow gas in the permeate will consequently give a more positive indication of leakage and/or module failure. Selectivity is the ratio of the permeate rate of the more permeable component of the mixture to the permeate rate of the less permeable component of the mixture being treated. Average permeability is reported in $ft^3(STP)/ft^2.psi.day$ The modules were tested by feeding the gas to the exterior surface of the hollow fiber membranes and collecting permeate from the bores of the hollow fiber membranes and measuring the rate of permeation and selectivity. The results in which the permeation rate of pure nitrogen and pure helium and the permeation rate and selectivity of a 90/10 mixture of helium over nitrogen are shown for the two modules are reported below. Comparative Module A could not be used at significantly increased pressures, it showed significant pot leakage between the hollow fibers and the tubesheet at a pressure approaching about 600 psi. On the other hand Module B, produced by the process of this invention, showed no sign of pot leakage at pressures approaching 1,000 psi.

The results showed that at pressures up to about 500 psi both modules had good selectivity and permeability properties. As shown in FIG. 2 essentially no leakage of nitrogen was found for either Module A or B. However, when the pressure was raised to about 600 psi using nitrogen alone Module A failed causing significant gas leakage between the embedded hollow fibers and the tubesheet. Under the same conditions Module B showed essentially no leakage; in fact even at pressures as high as about 1,000 psi essentially no leakage was observed with Module B.

The same modules were also evaluated before Module A failed, with the helium/nitrogen mixture. Module A showed an initial selectivity at pressures up to about 500 psi of helium over nitrogen of 91 and Module B showed a selectivity up to about 500 psi of 113.

After Module A had failed under the nitrogen pressure of about 600 psi, the module was tested with the helium/nitrogen mixture. At a pressure of only 100 psi the selectivity was now only 43, whereas before the failure the initial selectivity using the same gas mixture was 91, as stated above.

Also, as stated above, the initial selectivity of helium over nitrogen was 113 for Module B. After Module B had been tested with nitrogen alone at pressures up to about 1,000 psi without failure, Module B was used with the same helium/nitrogen mixture. The test showed a selectivity at a pressure of 950 psi of 123, a value higher than the initial selectivity value.

This data, as well as the data for nitrogen alone shown in Figure 2, establish that semipermeable membrane devices produced using the heat treatment process of this invention retain their properties even after high pressure use.

EXAMPLE 2

A series of runs was performed to establish the improvements in inside bore diameter and adhesion achieved when the tubesheet portion of permeable hollow fibers embedded in a tubesheet is treated in accord with this invention. In this series polysulfone hollow fibers similar to those described in Example 1 were coated in a manner similiar to that described in Example 1 with four different coating materials. Five modules were fabricated, each module containing a set of eight strands of one of the coated polysulfone hollow fibers. Each set of fibers was potted in an epoxy formulation comprised of 0.50 part by weight epoxy resin EPON828 ® (Bisphenol A/epichlorohydrin), 0.45 part by weight of NADIC ® Methyl Anhydride as hardener and 0.05 part of weight of dimethyl aminomethyl-phenol as accelerator to form a tubesheet 1.27 cm in diameter and 3.8 cm long. The epoxy tubesheet was allowed to gel, cured over a 2 hours period by gradually increasing the temperature to 109° C., and sliced. The cured tubesheet portion of each module was heated at 190° C., a temperature at least equal to the glass transition temperature of the polysulfone, for two hours and then gradually cooled to room temperature.

The original dimensions of the coated polysulfone hollow fibers were determined by microscopic measurement at a 200 fold magnification before potting and then after they had been subjected to the heating step in accord with this invention. These results are tabulated below. The data shows that regardless which coating material was used, the coated polysulfone hollow fiber portion embedded in this tubesheet densified after the tubesheet had been heated at 190° C. The heat treated tubesheet portion of the fibers showed no change in outside diameter of the hollow fibers and an increase in inside diameter of the hollow fibers; the microscopic examination also showed adhesion of the outside walls of the hollow fibers to the tubesheet. For comparison, a section of a small bundle of unpotted polysulfone hollow fibers was also heated at 190° under the same conditions. This bundle showed a decrease in both the outside diameter and the inside diameter of the hollow fibers, the decrease in the outside diameter due to the fact there was no surface adhering to it to prevent it from shrinkinq inwardly. The epoxy tubesheet prevented the inward shrinking of the hollow fiber so that the fiber bore was forced to shrink outward as the polysulfone densified and the inside bore diameter increased. Though slight differences were observed in the appearances of the densified portions of the differently coated hollow

TABLE 1

| Coating Material | OD/ID (mils) Inside Tubesheet | |
|---|---|---|
| | Original | After Heating* |
| CA | 13.8/5.4 | 13.8/10.6 |
| EC | 13.6/7.4 | 13.6/11.1 |
| CA/PMMA | 14.4/5.8 | 14.4/11.1 |
| TMBA-PE | 13.7/7.3 | 13.7/11.1 |
| TMBA-PE | 14.7/5.7 | 14.7/10.9 |

*after heating tubesheet portion at above the glass transition temperature (ca 190° C.)
CA — cellulose acetate
EC — ethyl cellulose
CA/PMMA — cellulose acetate/polymethyl methacrylate, 50/50 by weight
TMBA-PE — polyester of tetramethyl Bisphenol-A and mixed iso- and terephthaloyl chloride

What is claimed is:

1. A fluid separation device comprising:
    a bundle of selectively permeable hollow fibers;
    a resinous potting agent forming a tubesheet for the end portions of said permeable hollow fibers;
    said permeable hollow fibers having the ends of the inner bores thereof open; wherein the major portion of the bores of said permeable hollow fibers along a portion of their length embedded in said tubesheet has a larger inside bore diameter than the inside bore diameter of the section of said permeable hollow fibers not embedded in said tubesheet.

2. A fluid separation device as claimed in claim 1, wherein the walls of a portion of the section of permeable hollow fibers embedded in the tubesheet are essentially densified.

3. A fluid separation device as claimed in claim 1, wherein the permeable hollow fibers are a thermoplastic polymer.

4. A fluid separation device as claimed in claim I, wherein the permeable hollow fibers are polysulfone hollow fibers.

5. A fluid separation device as claimed in claim 1, wherein the tubesheet is an epoxy resin.

6. A fluid separation device as claimed in claim 4, wherein the tubesheet is an epoxy resin.

7. A fluid separation module comprising a fluid separation device as claimed in claim 1 in a casing.

8. A fluid separation module comprising a fluid separation device as claimed in claim 6 in a casinq.

9. A method for forming a fluid separation device comprising the steps of:
    forming a bundle of selectively permeable hollow fibers;
    potting the end portions of said bundle in a resinous potting agent to form a tubesheet;
    heating the tubesheet portion of said bundle at a temperature essentially equal to or greater than the glass transition temperature of the thermoplastic polymer or the softening point of the thermoset polymer of said selectively permeable hollow fibers for a period of time sufficient to essentially densify the hollow fibers in the tubesheet section; and severing the tubesheet to open the ends of the inner bores thereof.

10. A method as claimed in claim 9, wherein the tubesheet is sliced before said tubesheet is heated at a temperature essentially equal to or greater than the glass transition temperature or the softening point of said selectively permeable hollow fibers.

11. A method as claimed in claim 9, wherein said selectively permeable hollow fibers are a thermoplastic polymer.

12. A method as claimed in claim 10, wherein said selectively permeable hollow fibers are polysulfone.

13. A method as claimed in claim 9, wherein said tubesheet is an epoxy resin.

14. A method as claimed in claim 12, wherein the tubesheet is an epoxy resin.

15. A method as claimed in claim 10, wherein said selectively permeable hollow fibers are polysulfone hollow fibers.

16. A method as claimed in claim 10, wherein said tubesheet is an epoxy resin.

17. A method as claimed in claim 15, wherein the tubesheet is an epoxy resin.

* * * * *